(12) United States Patent
Mikiya et al.

(10) Patent No.: US 7,111,819 B2
(45) Date of Patent: Sep. 26, 2006

(54) STOP RING AND A HYDRAULIC/PNEUMATIC DEVICE EQUIPPED WITH A STOP RING

(75) Inventors: Toshio Mikiya, Tokyo (JP); Koji Matsumoto, Tokyo (JP)

(73) Assignee: Nitto Kohki Co., Ltd., Tokyo (JP)

(*) Notice: Subject to any disclaimer, the term of this patent is extended or adjusted under 35 U.S.C. 154(b) by 0 days.

(21) Appl. No.: 10/925,762

(22) Filed: Aug. 25, 2004

(65) Prior Publication Data
US 2005/0045845 A1  Mar. 3, 2005

(30) Foreign Application Priority Data
Aug. 25, 2003  (JP)  ............... 2003-300122

(51) Int. Cl.
*F16K 15/06*  (2006.01)
(52) U.S. Cl. .................................. 251/149.6
(58) Field of Classification Search ............. 251/149.6
See application file for complete search history.

(56) References Cited

U.S. PATENT DOCUMENTS

| | | | | |
|---|---|---|---|---|
| 2,674,495 A | * | 4/1954 | Lyon ............... | 301/37.108 |
| 2,729,126 A | * | 1/1956 | Stanton, Jr. et al. | ........ 269/137 |
| 2,811,889 A | * | 11/1957 | Wurzel ............. | 24/1 |
| 3,529,621 A | * | 9/1970 | Christiansen ...... | 137/315.26 |

FOREIGN PATENT DOCUMENTS

JP  2001-041332 A  2/2001

* cited by examiner

*Primary Examiner*—J. Casimer Jacyna
(74) *Attorney, Agent, or Firm*—Brinks Hofer Gilson & Lione

(57) ABSTRACT

A stop ring is made of an elastic member curved substantially in a plane into a ring shape having a first end and a second end spaced apart from each other in a circumferential direction. The first end is bent in a plane to incline inward with respect to a radial direction from the circumferential direction of the stop ring and to extend towards the second end.

3 Claims, 5 Drawing Sheets

STOP RING AND A HYDRAULIC/PNEUMATIC DEVICE EQUIPPED WITH A STOP RING

This application claims priority under 35 U.S.C. §119 to Japanese Patent Application No. 2003-300122 filed Aug. 25, 2003, the entire content of which is hereby incorporated by reference.

BACKGROUND OF THE INVENTION

The present invention relates to a stop ring, and in particular, to a stop ring for securing a valve at a predetermined position in an internal fluid passage of a hydraulic/pneumatic device member, such as a female and a male coupler constituting a pipe coupling.

FIG. 1 shows an example of a female coupler of a pipe coupling.

The female coupler 10 comprises a cylindrical female coupler body 16 including a fluid passage 14 having a male coupler inserting section 12 at one end thereof, a locking ball 18 disposed in the female coupler body for engaging with a male coupler inserted into the male coupler inserting section 12 and rigidly securing the male coupler in an inserted position, a sleeve 20 operatively mounted to an outside of the female coupler body so as to be slidable in an axial direction thereof to position the locking ball in a radial direction, and a valve assembly 22 arranged within the fluid passage 14 for opening and closing the fluid passage 14.

The valve assembly 22 comprises: a poppet valve 22-1 adapted to be movable in an axial direction of the fluid passage 14 between a closing position where the poppet valve engages with a valve seat 23 formed on a wall surface of the fluid passage to close the fluid passage, and an opening position where the poppet valve is retracted from the closing position to open the fluid passage; and a retainer 22-3 having a hole for receiving a valve stem 22-2 of the poppet valve so as to movably hold the poppet valve. The retainer 22-3 comprises a cylindrical valve retaining section 22-4 disposed in a central location of the fluid passage, and four fixing sections 22-5 extending radially outwardly from the cylindrical valve retaining section 22-4, wherein the fixing sections 22-5 engage with a stop ring 30 mounted to an interior surface of the female coupler body so as to securely hold the retainer 22-3 in the fluid passage 14.

This type of stop ring 30 is conventionally formed as a split-ring having ends (30-1 and 30-2) opposing each other in a circumferential direction. Upon fitting the ring in an annular groove 16-1 formed in the fluid passage wall, the opposing ends are pressed towards each other to reduce the diameter of the ring and thereby enable the ring to be fitted in the annular groove. Once the ring has been fitted in the groove, a contracting force to which the ring is subject before reaching the groove is released, thereby enabling the ring to expand under its own elastic force in the groove, whereby its opposing ends move apart from each other in a circumferential direction, and the ring securely seats in the groove.

The conventional stop ring described above, however, suffers from the problems detailed below.

Use of the conventional stop ring does not reliably ensure proper holding of the valve retainer. As described above, the stop ring is subject to a contracting force to reduce its diameter during fitting in the annular groove. Once the ring reaches the annular groove, it expands under its own elastic force to become securely seated in the groove, and its opposing ends move apart in a circumferential direction. Consequently, when the ring is seated in the groove a gap exists between the opposing ends 30-1 and 30-2. While the existence of such a gap enables the ring to be engaged for removal from the groove, it also gives rise to a problem that during use of the pipe coupling there is a possibility that the valve retainer 22-3 will become displaced in its circumferential direction. If such displacement occurs, one of the fixing sections 22-5 may come into mating contact with the gap between the ends of the ring, which could result in failure of the ring to hold the valve retainer 22-3.

One approach to overcoming the problem of the conventional art stated above is shown in FIG. 2. As shown in the figure, opposing and spaced apart ends 30-1 and 30-2 of the stop ring are bent to form respective radially inwardly extending protrusions. The fixing sections 22-5 are provided with notches 22-6, which are as shown in FIG. 1, formed in the radially outer edges thereof, and which are radially aligned with the setting groove 16-1 when the stop ring is installed in the valve retainer 22-3. In this way, it is possible to fit the stop ring with the notches and the protrusions 30-3 and 30-4 of the stop ring being positioned between adjacent fixing section 22-5 and 22-5 of the valve retainer 22-3. By this configuration, even if the valve retainer 22-3 is moved in the circumferential direction, one or other of the protrusions 30-3 or 30-4 will abut against one of the adjacent fixing section 22-5 and 22-5 of the valve retainer 22-3 which will prevent the fixing section from coming into mating contact with the gap between the ends 30-1 and 30-2 of the stop ring.

However, use of a process to bend each of the ends of the stop ring and/or a forming of the notches 22-6 in the valve retainer 22-3 as described above results in a significant increase in fabrication costs.

While efforts have been made in the conventional art to reduce a diameter of the stop ring for fitting in the setting groove 16-1, the work involved is complicated. In the conventional practice for reducing a diameter of the stop ring, the protrusions 30-3 and 30-4 illustrated in FIG. 2 are pulled towards each other using a tool; otherwise holes are formed in each end of the stop ring, and a tool is used to engage these holes and pull the ends of the ring towards each other. (Refer to Japanese Patent Laid-open Publication No. 2001-41332 and Japanese Patent Laid-open Publication No. Hei4-9492, the entire specifications of which are incorporated herein by reference.)

However, use of a process for forming such holes or protrusions again results in a significant increase in fabrication costs. Moreover, using a tool to engage such protrusions or holes to manipulate the stop ring is both difficult and time consuming.

SUMMARY OF THE INVENTION

The present invention has been made in the light of the above viewpoints, and an object thereof is to provide a novel and useful stop ring that has an extremely simple structure and has successfully solved all of the problems associated with the conventional stop ring.

That is, according to a first aspect of the present invention there is provided a stop ring made of an elongated elastic member curved substantially within a plane into a ring shape having a first end and a second end spaced apart from each other in a circumferential direction, the first end being bent within the same plane to incline inward with respect to a radial direction from the circumferential direction of the stop ring, and to extend in a direction of the second end.

In the thus configured stop ring, since the first end of the stop ring extends inward with respect to the radial direction at an angle from a wall surface of a fluid passage of a hydraulic/pneumatic device member, in which a setting groove for the stop ring is formed, in the state where the stop ring has been fitted in the setting groove, the stop ring can be released from the setting groove by an extremely simple process of inserting and sliding a needle-like elongated member between the first end and the wall surface.

Thus, the requirement for a gap to be provided between the ends of the stop ring in a state where the stop ring has been fitted in the setting groove can be eliminated. Accordingly, the present invention solves the problems stated above that are associated with the conventional art.

According to a second aspect of the present invention, there is provided a stop ring to be fitted in a setting groove defining an annular recess in a wall surface of a fluid passage of a hydraulic/pneumatic device member in which a valve retainer is provided, the valve retainer comprising a retaining section for retaining a valve member disposed within the fluid passage in a substantially central location of the fluid passage and the plurality of fixing sections spaced apart from each other in a circumferential direction, each of the fixing sections extending from the retaining section outward in a radial direction to the wall surface of the fluid passage. The stop ring is made of an elongated elastic member curved within a plane into a ring shape having a first end and a second end spaced apart from each other in a circumferential direction.

The first end is bent within the above-stated plane to incline inward with respect to a radial direction from the circumferential direction of the stop ring as a reference and to extend to a direction of the second end; wherein the stop ring is designed such that, in a state where the stop ring has been fitted in the setting groove, an inner portion of the stop ring with respect to the radial direction is located inside the wall surface of the fluid passage so that the fixing sections of the valve retainer bear on the stop ring; and When viewed from the center inside the fluid passage, the first end is spaced apart from the second end by a smaller distance than a circumferential width of an outer end portion of the fixing section in the radial direction, which bears on the stop ring, the first end may overlap the second end.

By use of this stop ring, a similar action and effect to that described above can be obtained.

According to a third aspect of the present invention, there is provided a hydraulic/pneumatic device comprising:

a hydraulic/pneumatic device member having a fluid passage for allowing a fluid to flow therethrough;

a valve member disposed within the fluid passage;

a valve retainer comprising a retaining section for retaining the valve member in a substantially central location within the fluid passage, and a plurality of fixing sections spaced apart from each other in a circumferential direction, each of the fixing sections extending from the retaining section outward in a radial direction to a wall surface of the fluid passage; and a stop ring to be fitted in a setting grove defining an annular recess in the wall surface of the fluid passage of said hydraulic/pneumatic device member, for securely holding said valve retainer within said fluid passage by allowing said plurality of fixing sections of said valve retainer to bear on said stop ring, wherein the stop ring is made of an elongated elastic member curved into a ring shape having a first end and a second end spaced apart from each other in a circumferential direction, and the first end is bent within a plane of the ring shape to incline inward with respect to a radial direction from the circumferential direction of the stop ring as a reference and to extend to a direction of the second end.

Preferably, when viewed from the center inside the fluid passage, the first end is spaced apart from the second end by a smaller distance than a circumferential width of an outer end portion of the fixing section in the radial direction, which bears on the stop ring, or the first end may overlap the second end.

This hydraulic/pneumatic device, which has been equipped with the stop ring having the characteristic features described above, can solve all the problems associated with the stop ring of the conventional art; and at the same time it allows attaching and detaching of the valve to be carried out in an extremely simple manner as compared to the conventional art and also ensures retaining of the valve with high reliably.

DEATAILED DESCRIPTION OF THE INVENTION

A preferred embodiment of a stop ring according to the present invention will now be described.

Figure 3:
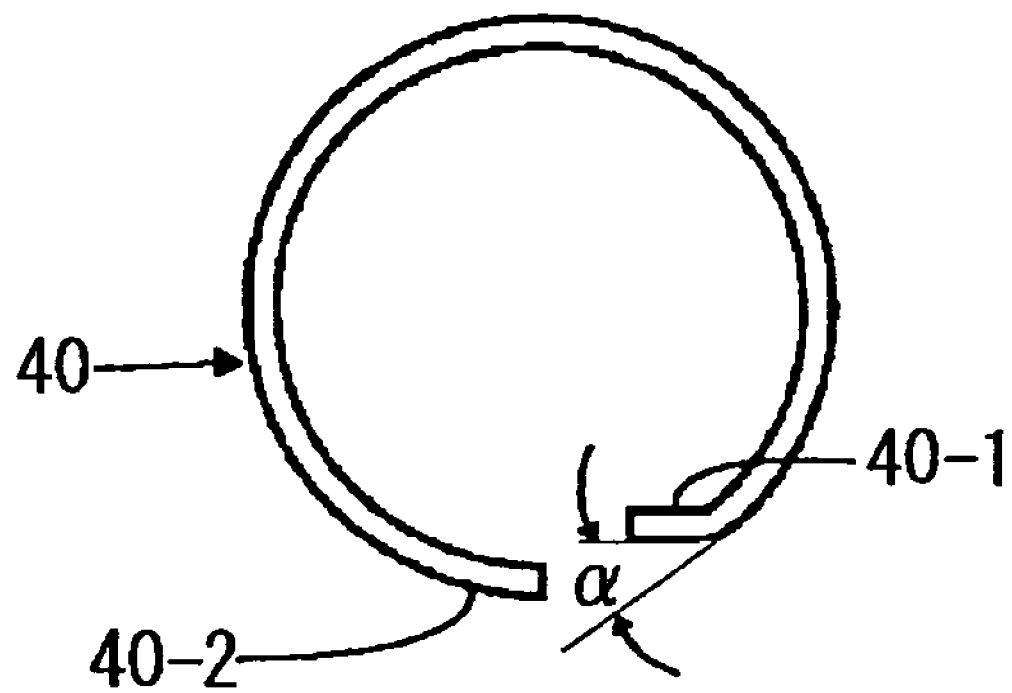
FIG. 3 is a plan view of a stop ring according to the present invention.

FIG. 3 is a plan view of a stop ring 40 according to the present invention. The stop ring 40 is made of an elongated elastic member curved substantially in a plane into a ring shape having a first end 40-1 and a second end 40-2 spaced apart from each other in a circumferential direction, in which the first end 40-1 is bent in the same plane to incline radially inwardly at an acute angle a from a circumferential direction of the stop ring and to extend to a direction of the second end 40-2.

Figure 4:
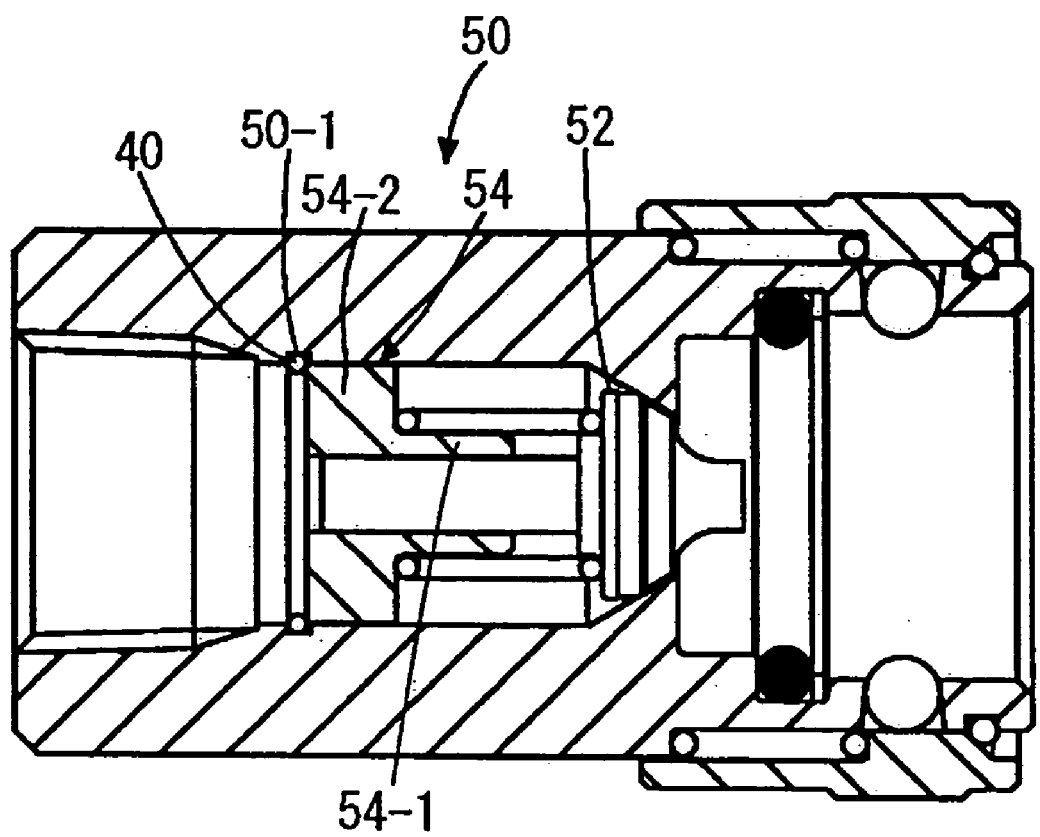
FIG. 4 is a longitudinal section view of a female coupler equipped with the stop ring of FIG. 3.
Figure 5:
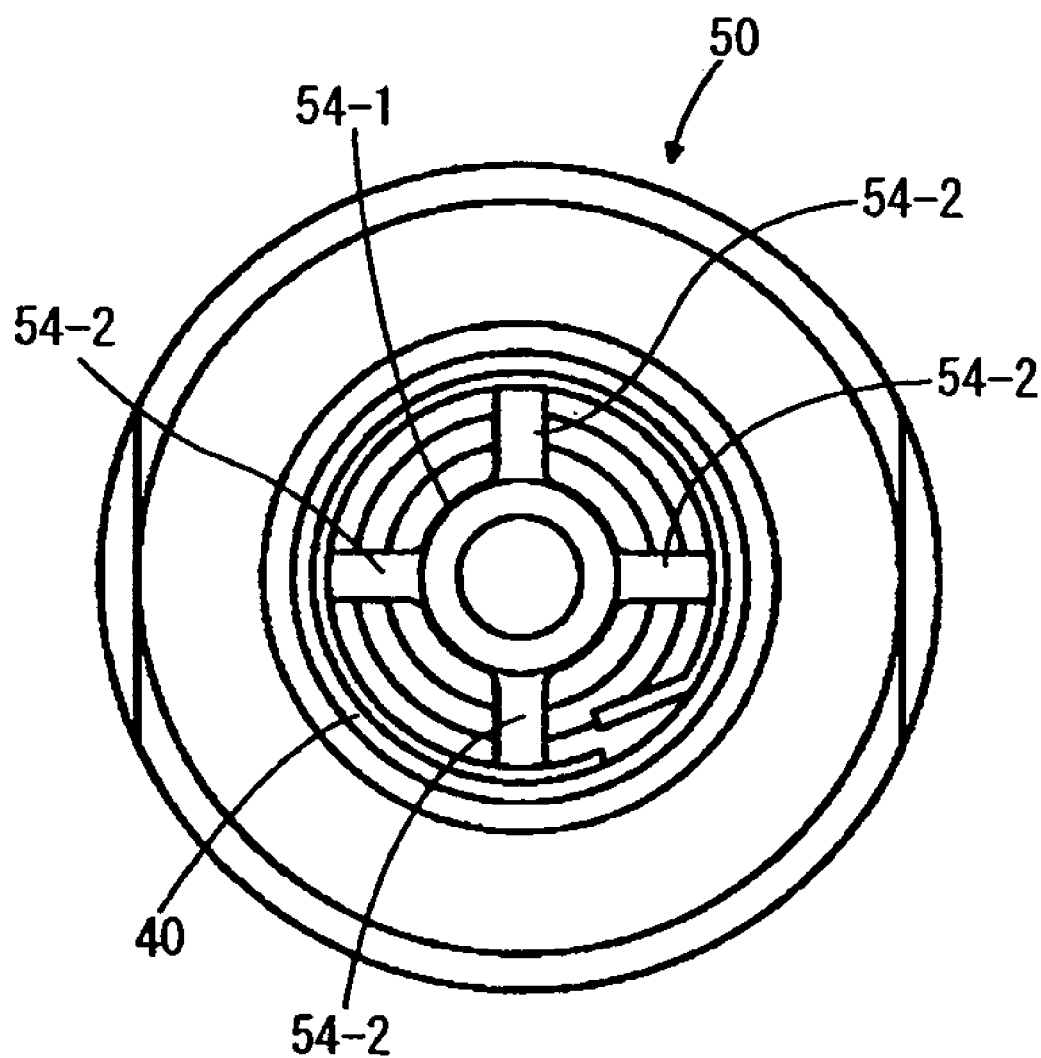
FIG. 5 is a left end view of the female coupler of FIG. 4.

FIGS. 4 and 5 show a state in which the stop ring 40 has been fitted in an annular setting groove 50-1 formed in a wall surface of a fluid passage of a hydraulic/pneumatic device member or female coupler 50.

The female coupler 50 includes a poppet valve 52 disposed within the fluid passage and a valve retainer 54 for retaining the poppet valve in a substantially central location of the fluid passage, and the valve retainer 54 comprises a cylindrical retaining section 54-1 and four fixing sections 54-2 spaced apart from each other by an angular interval of 90° in the circumferential direction and extending radially outward from the retaining section 54-1 to the wall surface of the fluid passage.

The stop ring 40 is designed such that, in a state where it has been fitted in the setting groove 50-1, an inner portion of the stop ring with respect to the radial direction is located inside the wall surface of the fluid passage, so that the fixing sections 54-2 of the valve retainer engage with the stop ring, and such that when viewed from the center inside the fluid passage, an end surface the first end 40-1 is substantially aligned with an end surface of the second end 40-2.

Figure 1:
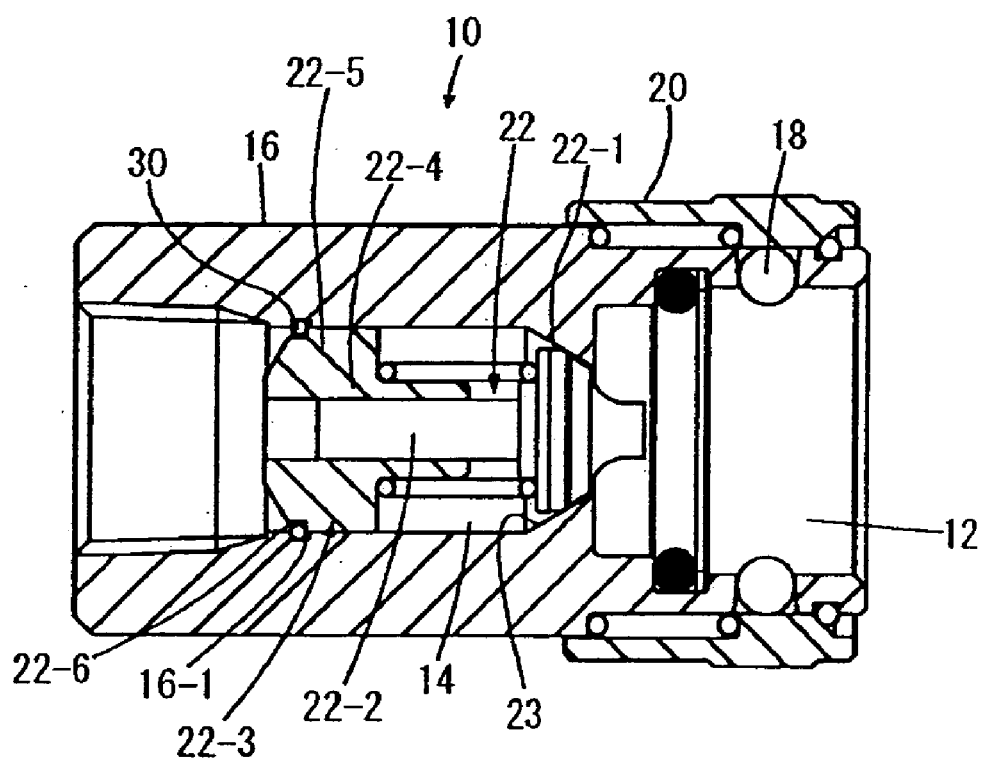
FIG. 1 is a longitudinal section view of a female coupler of a pipe coupling equipped with a stop ring according to the prior art.
Figure 2:
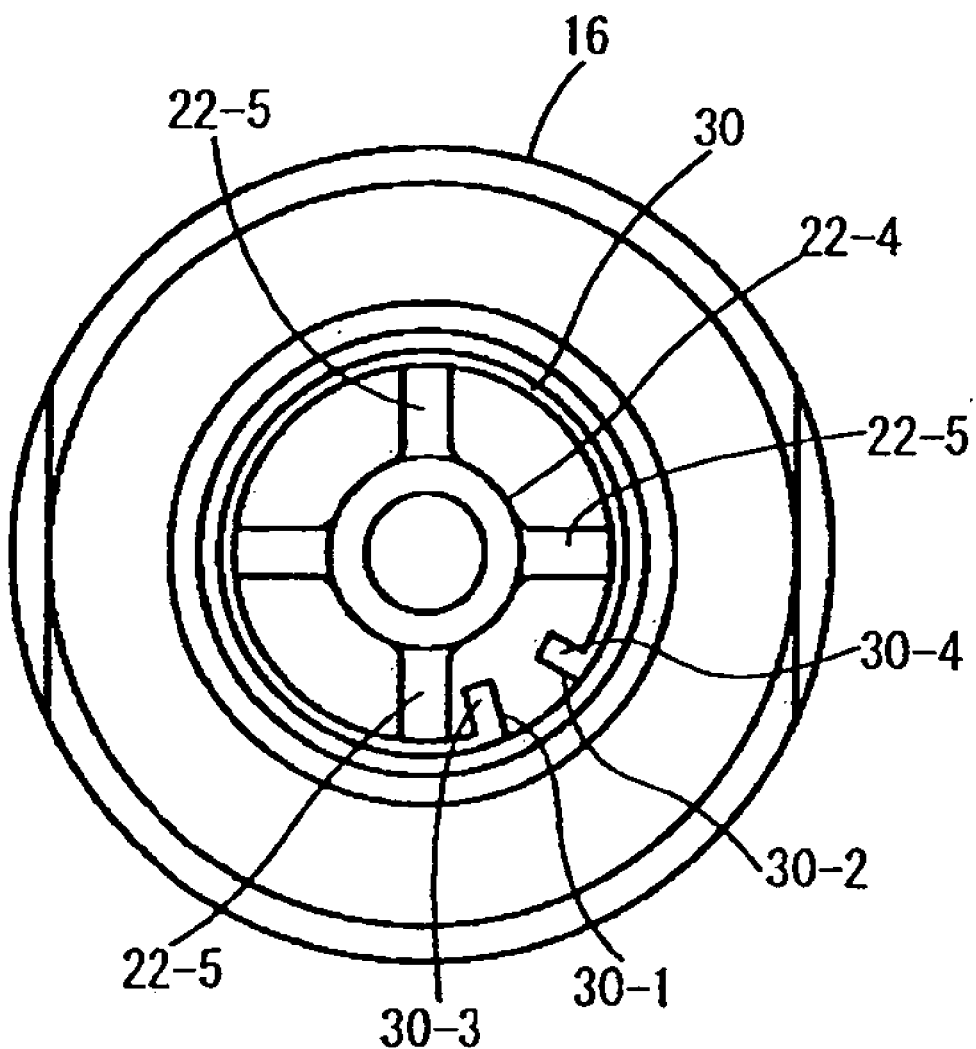
FIG. 2 is a left end view of the female coupler of FIG. 1.

Although the fixing section 54-2 of the valve retainer 54 may be provided with a notch similar to the notch 16-1 shown in FIG. 1, the fixing section 54-2 shown in FIG. 4 includes no such notch. This is because it is not necessary to arrange the ends of the stop ring to be positioned between the adjacent fixing sections 54-2 and 54-2, unlike in the prior art described above.

In fitting the stop ring 40 in the annular groove formed in the interior surface of the female coupler, firstly the stop ring is gripped at its first end side by a tool and inserted into the fluid passage of the female coupler so as to be partially fitted in the annular groove 50-1. Then, the first end side of the stop ring is further advanced into the fluid passage to thereby cause the entire stop ring to be fitted in the annular groove.

To remove the stop ring from the annular groove, however, a needle-like elongated tool is inserted into the fluid passage and its tip end is manipulated to be inserted between the wall surface of the fluid passage and the first end extending radially inwardly at an angle from the wall surface. The tool is then moved in the circumferential direction along the inclination of the first end, to thereby enable the stop ring to be very easily removed from the annular groove.

The stop ring according to the present invention has been described in relation to a case where it is used to bear and hold a valve arranged in a female coupler; and the advantageous effects of the invention of simple fitting and very simple and easy removal of the stop ring have been described in the same context. However, it will be appreciated by those skilled in the art that use of the present invention is in no way to be taken as being limited to the example described above, and will find a variety of uses limited only by the scope of the appended claims.

What is claimed is:

1. A stop ring to be fitted in an annular recess circumferentially formed in a wall surface of a fluid passage of a hydraulic/pneumatic device member in which a valve retainer is provided, said valve retainer comprising:
   a retaining section for retaining a valve member along an axis of said fluid passage; and
   a plurality of fixing sections extending from said retaining section radially outwardly and circumferentially spaced apart from each other; wherein
   said stop ring is made of an elongated elastic member curved in a plane into a ring shape having a first end and a second end spaced apart from each other in a circumferential direction;
   said first end is bent in the said plane to incline inward with respect to a radial direction from the circumferential direction of said stop ring as a reference and to extend towards said second end; and
   in a state where said stop ring has been fitted in said annular recess, said first end is, as viewed from a center of said fluid passage, spaced apart from said second end by a smaller distance than a circumferential width of a radially outer end portion of said fixing section, which engages with said stop ring, or said first end overlaps said second end.

2. A hydraulic/pneumatic device comprising:
   a hydraulic/pneumatic device member having a fluid passage for allowing a fluid to flow therethrough;
   a valve member disposed within said fluid passage;
   a valve retainer comprising a retaining section for retaining said valve member in said fluid passage, and a plurality of fixing sections extending from said retaining section outward in a radial direction and spaced apart from each other in a circumferential direction; and
   a stop ring fitted in an annular recess formed in a wall surface of the fluid passage of said hydraulic/pneumatic device member, for securely holding said valve retainer within said fluid passage, by engaging with radially outer ends of said fixing sections;
   wherein said stop ring is made of elongated elastic member curved in a plane into a ring shape having a first end and a second end spaced apart from each other in a circumferential direction, and said first end is bent in said plane to incline inward with respect to a radial direction from the circumferential direction of said stop ring as a reference and to extend towards a direction of said second end.

3. A hydraulic/pneumatic device in accordance with claim 2, in which:
   said stop ring is designed such that, in a state where said stop ring has been fitted in said annular recess, an inner portion of said stop ring with respect to the radial direction is located radially inside the wall surface of said fluid passage so that radially outer end portions of said fixing sections of the valve retainer engage with said stop ring; and
   when viewed from a center of said fluid passage, said first end is spaced apart from said second end by a smaller distance than a circumferential width of the radially outer end portion of said fixing section, which bears on said stop ring, or said first end overlaps said second end.

* * * * *